(12) United States Patent
Takasu

(10) Patent No.: US 9,552,020 B2
(45) Date of Patent: Jan. 24, 2017

(54) ELECTRONIC APPARATUS

(71) Applicant: KABUSHIKI KAISHA TOSHIBA, Minato-ku, Tokyo (JP)

(72) Inventor: Nobuaki Takasu, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/828,739

(22) Filed: Aug. 18, 2015

(65) Prior Publication Data

US 2016/0149597 A1  May 26, 2016

Related U.S. Application Data

(60) Provisional application No. 62/084,983, filed on Nov. 26, 2014.

(51) Int. Cl.
| | |
|---|---|
| *H01Q 11/12* | (2006.01) |
| *H04B 1/04* | (2006.01) |
| *G06F 1/16* | (2006.01) |
| *G06F 1/32* | (2006.01) |

(52) U.S. Cl.
CPC ........... *G06F 1/1677* (2013.01); *G06F 1/1632* (2013.01); *G06F 1/1669* (2013.01); *G06F 1/1684* (2013.01); *G06F 1/1698* (2013.01); *G06F 1/3231* (2013.01); *G06F 1/3287* (2013.01)

(58) Field of Classification Search
CPC . H04B 1/04; H04B 2001/0416; G06F 1/1698; G06F 1/1618; G06F 1/1632; G06F 1/1677; H03G 3/3042; H03F 3/24; H03F 1/0205
USPC .... 455/41.1, 41.2, 127.1, 127.5, 522, 550.1, 455/575.1, 575.3
See application file for complete search history.

(56) References Cited

U.S. PATENT DOCUMENTS 8,581,739 B2 * 11/2013 Koppal ............... H04M 1/0235
340/686.1
2009/0305742 A1 * 12/2009 Caballero ............ H04B 1/3838
455/566

FOREIGN PATENT DOCUMENTS

| JP | 2008-090345 | 4/2008 |
| JP | 2012-239108 | 12/2012 |
| JP | 2013-162413 | 8/2013 |

* cited by examiner

*Primary Examiner* — Nhan Le
(74) *Attorney, Agent, or Firm* — Foley & Lardner LLP

(57) ABSTRACT

According to one embodiment, an electronic apparatus includes a first unit and circuitry. The first unit includes first and second sensors and a wireless device. The first sensor detects approach of an object. The second sensor detects whether the first unit is open or closed. The circuitry reduces transmission power of the wireless device when the first sensor detects approach of the object, and not to reduce transmission power when the second sensor detects a change from an open state to a closed state and the first sensor detects approach of the object.

14 Claims, 8 Drawing Sheets

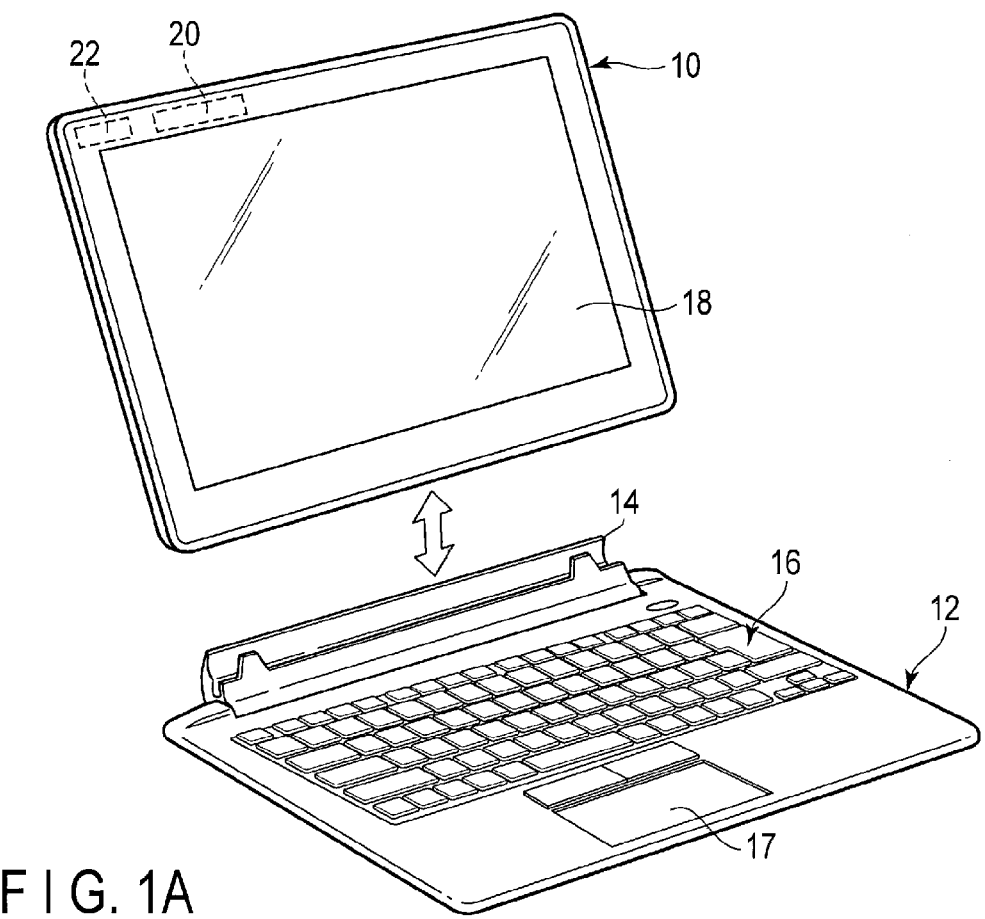
F I G. 1A
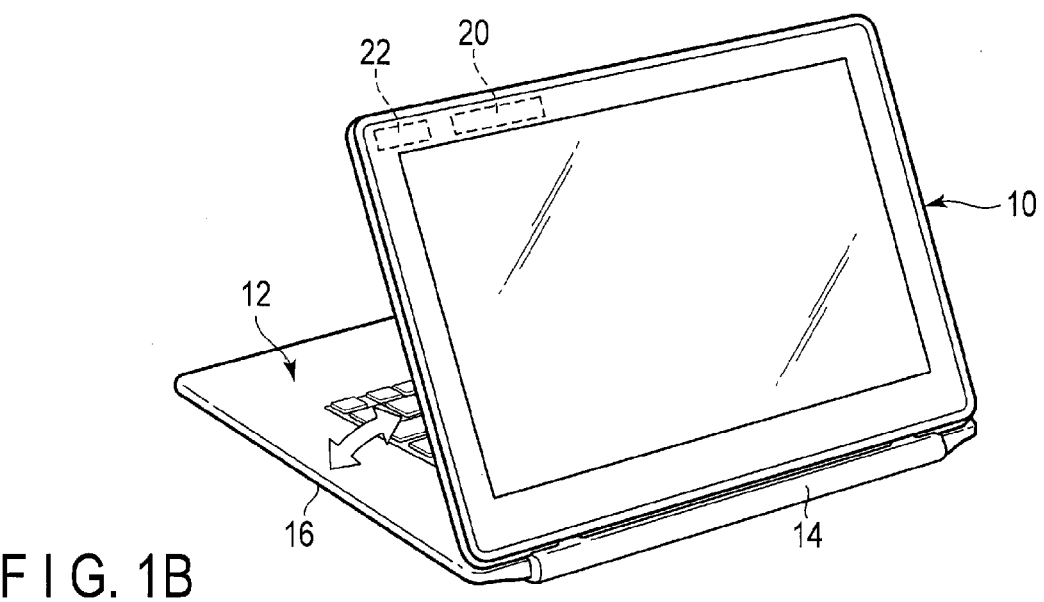
F I G. 1B

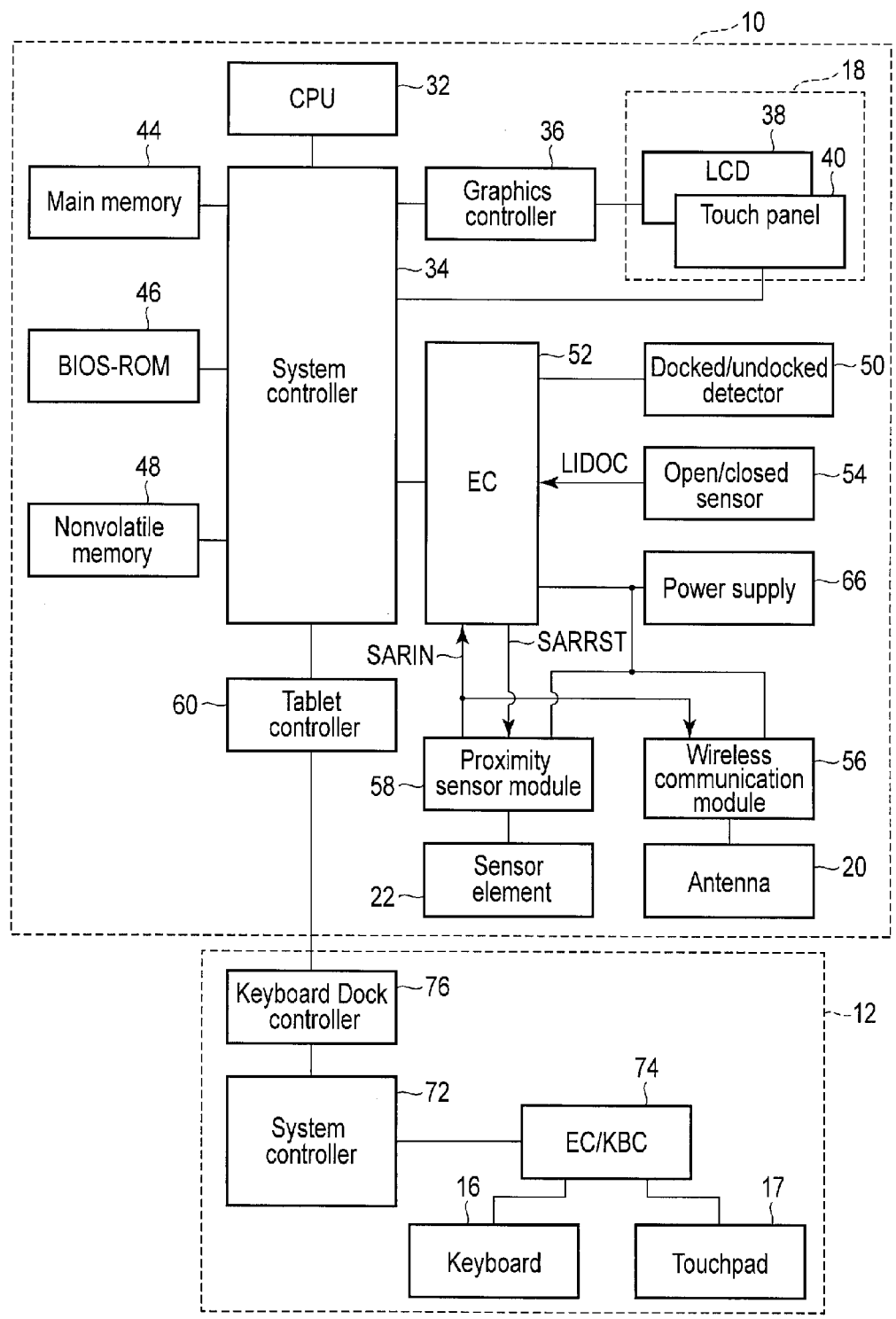
F I G. 2

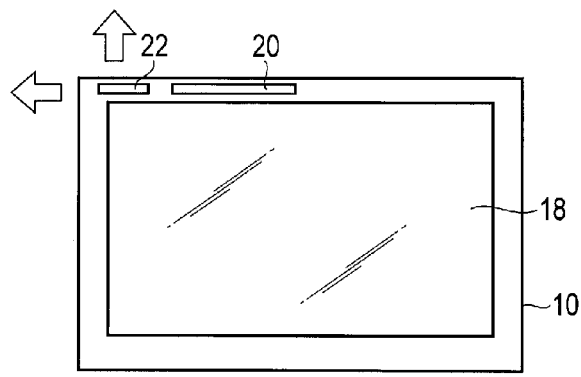
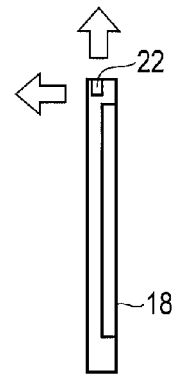
FIG. 3A  FIG. 3B
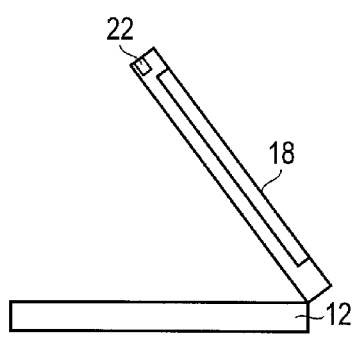
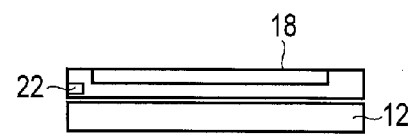
FIG. 4A  FIG. 4B
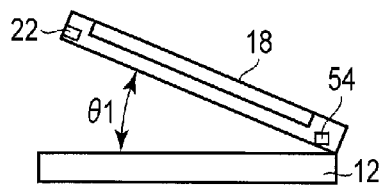
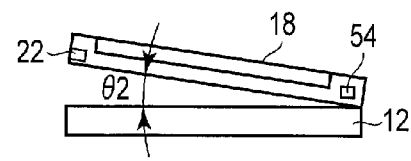
FIG. 5A  FIG. 5B

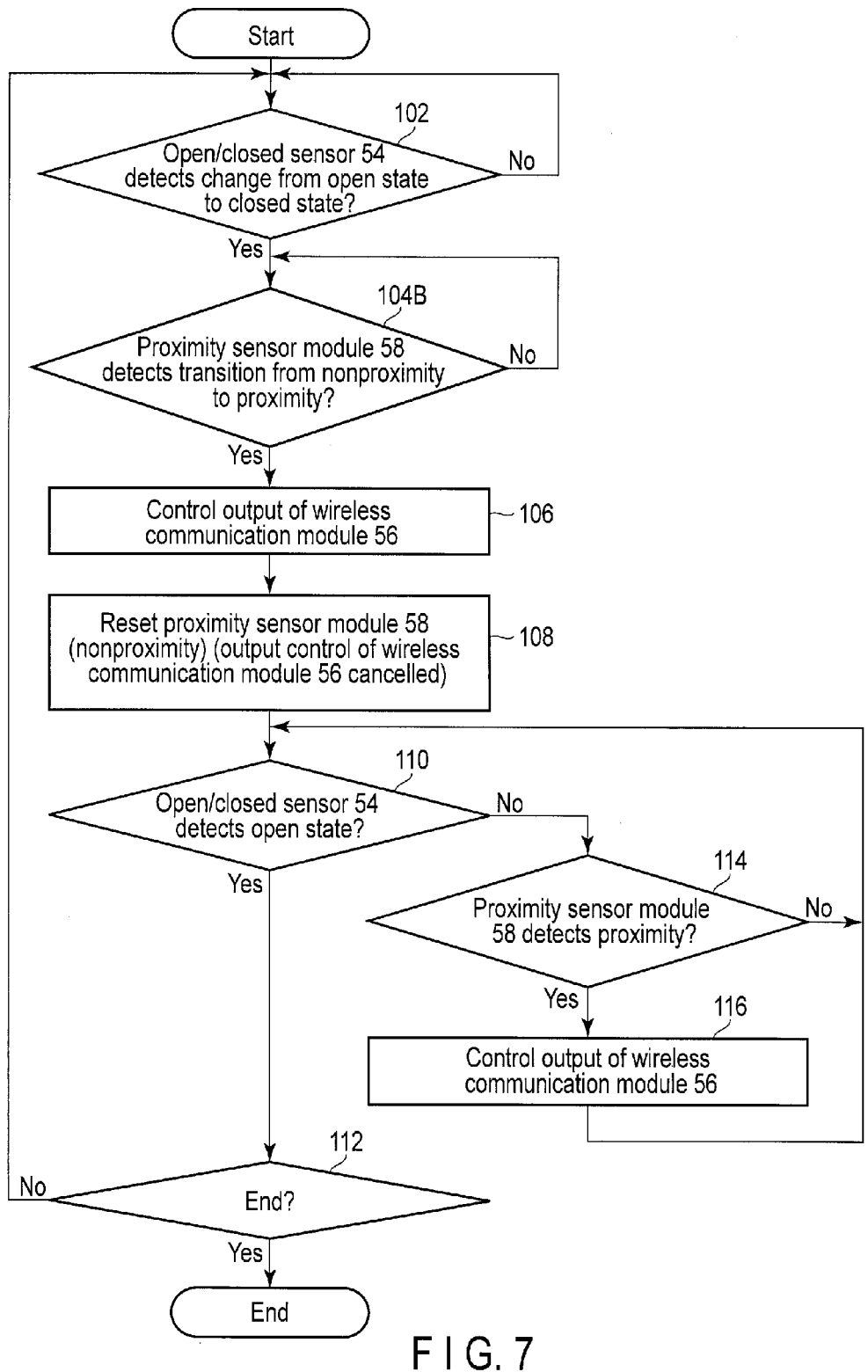
F I G. 7

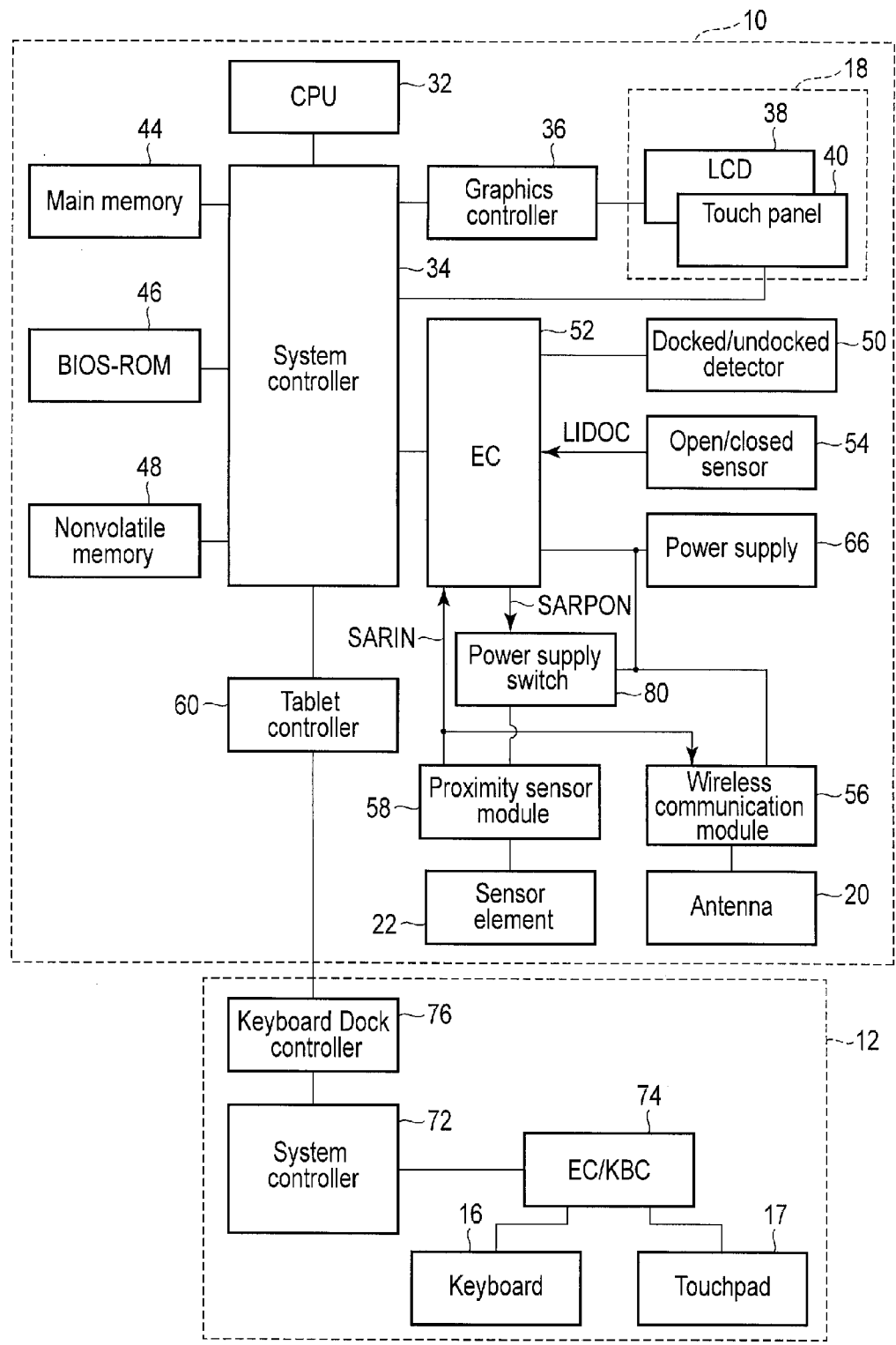
F I G. 8

ELECTRONIC APPARATUS

CROSS-REFERENCE TO RELATED APPLICATIONS

This application claims the benefit of U.S. Provisional Application. No. 62/084,983, filed Nov. 26, 2014, the entire contents of which are incorporated herein by reference.

FIELD

Embodiments described herein relate generally to an electronic apparatus having a function of detecting the approach of a human body.

BACKGROUND

Notebook PCs and tablet PCs (hereinafter, referred to as tablets) are widely used. These apparatuses are equipped with wireless communication devices for accessing the Internet in mobile environments. It is known that radio waves may cause heating effects on human bodies if their levels are high. Since a strength of radio waves which causes the effects on the human bodies has been found out, safety standards of radio waves are established on the basis of the strength. Wireless output of the apparatuses must satisfy the safety standards.

Therefore, the apparatuses each include a proximity sensor which detects the approach of a human body, and is configured to control transmission output when being approached by the human body. The proximity sensor is, for example, a capacitive detection sensor. A capacitor is formed of two parallel plates in which a detection surface of the sensor is one electrode and an object to be detected (human body) is the other electrode, and the proximity of the object to be detected can be detected on the basis of capacitance between the electrodes.

In recent years, detachable PCs have been developed. A detachable PC corresponds to a normal notebook PC in which a display and a keyboard (also referred to as a keyboard dock) are attachable and detachable. The display can be used alone as a tablet. When the display is fixed to a docking port of the keyboard dock, the detachable PC assumes the form of an open notebook PC, and can be used as if it were a notebook PC. In the form of a notebook PC, the docking port can be rotated by a hinge mechanism, and the display can be closed while being fixed to the keyboard dock. In this case, a display screen of a tablet 10 faces the keyboard dock 12 and is not exposed. If the display can be fixed to the docking port either face up or face down, the detachable PC can also be used as if it were a tablet, by closing the display while fixing the display to the docking port of the keyboard dock 12 in a reverse way to that in the form of a notebook PC to make a back surface of the tablet 10 face the keyboard dock 12 and expose the display screen. Since the tablet 10 is laid on the keyboard dock 12, a proximity sensor may detect the proximity of the keyboard dock 12, not the human body and unnecessarily decrease transmission output although not being approached by the human body, whereby wireless communication performance deteriorates.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1A shows an example of an outside of an electronic apparatus according to an embodiment.

FIG. 1B shows another example of the outside of the electronic apparatus.

FIG. 2 is a block diagram showing an example of a system configuration of the electronic apparatus.

FIG. 3A is a plan view showing an example of a tablet of the electronic apparatus.

FIG. 3B is a side view showing an example of the tablet of the electronic apparatus.

FIG. 4A is a side view showing an example of the electronic apparatus in a standard mode.

FIG. 4B is a side view showing an example of the electronic apparatus in a reverse tablet mode.

FIG. 5A shows an example of operation of an open/closed sensor of the electronic apparatus in the reverse tablet mode.

FIG. 5B shows an example of operation of a proximity sensor of the electronic apparatus in the reverse tablet mode.

FIG. 7 is a flowchart showing another example of operation of the electronic apparatus.

FIG. 8 is a block diagram showing another example of the system configuration of the electronic apparatus.

DETAILED DESCRIPTION

Figure 6:
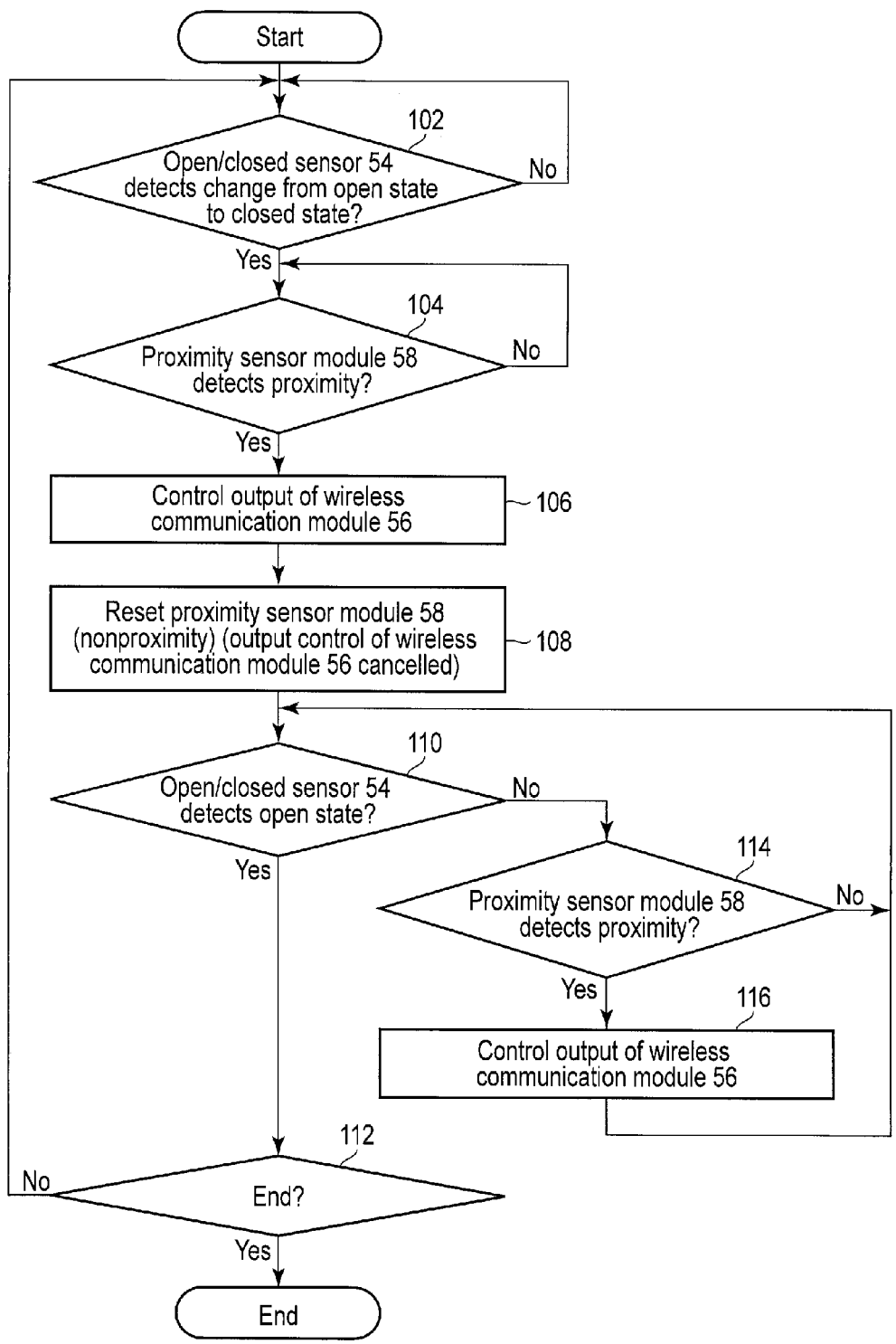
FIG. 6 is a flowchart showing an example of operation of the electronic apparatus.

Various embodiments will be described hereinafter with reference to the accompanying drawings.

In general, according to one embodiment, an electronic apparatus includes a first unit and circuitry. The first unit is configured to be open and closed with respect to a second unit. The first unit includes a first sensor, second sensor, and wireless communication device. The first sensor is configured to detect approach of an object. The second sensor is configured to detect whether the first unit is open or closed. The circuitry is configured to reduce transmission power of the wireless communication device when the first sensor detects approach of the object, and not to reduce transmission power of the wireless communication device when the second sensor detects a change from an open state to a closed state and the first sensor detects approach of the object.

For example, in a detachable notebook PC, or a tablet alone, the tablet corresponds to the first unit, and the keyboard dock corresponds to the second unit. In a normal notebook PC, the first unit corresponds to a display panel, and the second unit corresponds to a main body (keyboard).

FIG. 1A is a perspective view showing an example of a structure of an electronic apparatus of an embodiment. The embodiment is a detachable notebook PC. A display (also referred to as a tablet) 10 and a keyboard (also referred to as a keyboard dock) 12 are attachable and detachable. The tablet 10 includes a touch screen display 18 on which a touch operation can be performed so that the tablet 10 can be detached from the keyboard dock 12 to be used as a tablet alone (tablet alone mode). Because a circuit board is formed on a back surface of the touch screen display 18, an antenna 20 (and a wireless communication module 56: see FIG. 2) and a sensor element 20 (and a proximity sensor module 58: see FIG. 2) are disposed in the remaining space (for example, an upper left end) on the periphery of the tablet 10. The tablet 10 and the keyboard dock 12 both contain a battery and can operate without an AC power supply.

The keyboard dock 12 includes a keyboard 16, a touchpad 17, and a support 14 which fixes the tablet 10 at a predetermined angle. The support 14 is provided on a back end of the keyboard dock 12, and can be rotated by a hinge mechanism. An open/closed angle of the hinge mechanism is approximately between zero (closed state) and 120 degrees (open state). A docking port is provided at a predetermined position (for example, one point in a center portion, or two points on right and left ends) on a lower side surface of the tablet 10. In the support 14, a docking connector into which the docking port is inserted when the tablet 10 is inserted into the support 14 is provided. The docking connector has a plug shape including a pin, and the docking port has a receptacle shape into which the pin is inserted. Thus, when the tablet 10 is mounted on the support 14, the docking port and the docking connector are connected to reproduce the same state as that of an open notebook PC (notebook PC mode). Since the support 14 includes the hinge mechanism, the tablet 10 can be closed while being inserted into the support 14.

The docking connector and the docking port are bilaterally symmetrical. Thus, the tablet 10 can be fixed to the docking port either face up or face down (face up in FIG. 1A). If the tablet 10 is fixed to the docking port face down and the open/closed angle of the hinge mechanism is set at 90 degrees or less, the electronic apparatus can be used in a stand mode as shown in FIG. 1B. If the open/closed angle of the hinge mechanism is further reduced to zero from the stand mode, a back surface of the tablet 10 is brought into contact with a surface of the keyboard 16, and the electronic apparatus can also be used in a reverse tablet mode in which the tablet 10 is laid on the keyboard dock 12. Further, the electronic apparatus may be used as a tablet in the state where the back surface of the tablet 10 is in contact with the back surface of the keyboard dock, by setting the upper limit of the open/closed angle of the hinge mechanism of the support 14 at 360 degrees and further inclining the tablet 10 backward from the state of FIG. 1A where the tablet 10 is fixed to the docking port face up. In this manner, since the tablet 10 can be connected to the docking port either face up or face down and the hinge can rotate at zero to 360 degrees, a positional relationship between the tablet and the keyboard dock 12 can be variously changed.

FIG. 2 is a block diagram showing an example of a system configuration of the tablet 10 and the keyboard dock 12. The tablet 10 includes a CPU 32, a system controller 34, a graphics controller 36, an LCD 38 and a touch panel 40 which are in the touch screen display 18, a main memory 44, a BIOS-ROM 46, a nonvolatile memory 48, a docked/undocked detector 50, an embedded controller (EC) 52, an open/closed sensor 54, the wireless communication module 56, the antenna 20, the proximity sensor module 58, the sensor element 22, a tablet controller 60, etc.

The CPU 32 controls various components in the tablet 10. The CPU 32 executes various kinds of software including an operating system (OS) loaded from the nonvolatile memory 48, which is a storage device, to the main memory 44. The various kinds of software include software related to output control over the wireless communication module 56 exerted when the proximity of the human body to the tablet 10 is detected. The CPU 32 also executes a Basic Input/Output System (BIOS) stored in the BIOS-ROM 46. The BIOS is a program for hardware control. The system controller 34 is a device which connects the CPU 32 and various components.

The system controller 34 also contains a memory controller which exerts access control over the main memory 44. The system controller 34 also has a function of communicating with the graphics controller 36 through a serial bus conforming to the PCI EXPRESS standard, etc. The graphics controller 36 is a display controller which controls the LDC 38 used as a display monitor of the tablet 10. A display signal generated by the graphics controller 36 is transmitted to the LCD 38. On the LCD 38, the touch panel 40 is disposed. A signal from the touch panel 40 is supplied to the system controller 34. The tablet controller 60 is an interface which performs communication between the tablet 10 and the keyboard dock 12.

The docked/undocked detector 50 detects connection and disconnection between the docking port of the tablet 10 and the docking connector of the keyboard dock 12, and supplies a detection result to the EC 52. The detection may be based on, for example, a change in level of a dedicated point of contact due to docking/undocking, or may be based on an ON/OFF state of a mechanical switch provided in the support 14.

The EC 52 is a single chip microcomputer including an embedded controller for power management. The EC 52 has a function of turning on or off a power supply of the tablet 10 in accordance with a user's operation of a power button. A power supply circuit 66 which converts a voltage from a battery or an AC power supply into a power supply voltage to be supplied to an internal circuit is provided on a substrate of the touch screen display 18. The power supply circuit 66 is connected to the EC 52.

The open/closed sensor 54 detects an open/closed state of the tablet 10 by detecting a magnetic field from a magnet (not shown in the figure) provided in the keyboard dock 12 by a Hall element provided in the tablet 10, and supplies an open/closed detection signal LIDOC to the EC 52. Here, when the tablet 10 is closed with respect to the keyboard dock 12 at a predetermined distance, an open/closed detection signal LIDOC indicating being closed is generated. The open/closed detection signal LIDOC is a binary signal indicating being open or closed.

The proximity sensor module 58 is a capacitive proximity sensor which is connected to the sensor element 22, measures the capacitance between the sensor element 22 to be one electrode of a capacitor and an object to be detected to be the other electrode, detects the proximity of the object to be detected in accordance with the capacitance with respect to a standard, and supplies a proximity detection signal SARIN to the EC 52 and the wireless communication module 56. When the capacitance reaches a predetermined value or more, a proximity detection signal SARIN indicating proximity is generated. The proximity detection signal SARIN is a binary signal indicating proximity or nonproximity. The proximity sensor module 58 is reset by a reset signal SARRST from the EC 52. With the state at the time of the reset regarded as a new standard, the proximity sensor module 58, again, measures the capacitance between the sensor element 22 and the object to be detected, and detects the proximity of the object. That is, for example, if the proximity sensor module 58 is reset while detecting the proximity of the object, the proximity sensor module 58 detects nonproximity even if a positional relationship between the object and the sensor element 22 is the same as it was before the reset.

The wireless communication module 56 is a device configured to perform wireless communication such as wireless LAN or 3G mobile communication for connecting the tablet 10 to the Internet, etc. If a proximity detection signal SARIN indicating proximity is supplied from the proximity sensor module 58, the wireless communication module 56 controls wireless output. In this manner, three wires of a reset signal line to the EC 52, a reset signal line from the EC 52 and a power supply line from the power supply circuit 66 are connected to the proximity sensor module 58. Because the proximity sensor module 58 is provided at an upper end of the tablet 10 as shown in FIG. 1A, the wires from the EC 52 and the power supply circuit 66 are in a harness, and are connected to the proximity sensor module 58 through a connector. That is, the harness includes three wires.

The keyboard dock 12 includes a keyboard dock controller 76 which is an interface communicating with the tablet 10, the keyboard 16, the touchpad 17, an embedded controller/keyboard controller (EC/KBC) 74, and a system controller 72 connecting them.

Next, wireless output control exerted because of the proximity of the human body will be described. As shown in FIG. 3A and FIG. 3B, the sensor element 22 provided in proximity to the antenna 20 is configured to detect proximity in three directions shown in the figures. The sensor element 22 is provided at a left upper end of the tablet 10, and thus detects the proximity of the human body above, in front of, and on the left of the tablet 10. The antenna 20 and the sensor element 22 are disposed not only in this manner, and may be disposed anywhere on the periphery of the touch screen display 18.

FIG. 4A is a side view showing a positional relationship of the tablet 10 to the keyboard dock 12 in the stand mode shown in FIG. 1B. The tablet 10 is held at an angle of approximately 45 degrees with respect to the keyboard dock 12 to expose a display screen of the touch screen display 18. Since the sensor element 22 is located at the upper end, the keyboard dock 12 and the sensor element 22 are separated in this state, and the proximity sensor module 58 does not detect proximity unless the human body is in proximity to the sensor element 22. If the proximity sensor module 58 detects proximity, wireless output is controlled.

When the tablet 10 is inclined toward the keyboard dock 12 from the state of FIG. 4A and the open/closed angle of the hinge mechanism is reduced to zero, as shown in FIG. 4B, the back surface of the tablet 10 is brought into contact with the surface of the keyboard dock 12, and the electronic apparatus enters the reverse tablet mode in which the tablet 10 is laid on the keyboard dock 12 with the display screen of the touch screen display 18 exposed. In this state, because the keyboard dock 12 and the sensor element 22 are in proximity, the proximity sensor module 58 detect proximity even if the human body is not in proximity to the sensor element 22, and wireless output is unnecessarily controlled.

To prevent this, in the embodiment, wireless output control is stopped and cancelled in consideration of a detection result of the open/closed sensor 54. As shown in FIG. 5A, when a switch is made from the stand mode to the reverse tablet mode, the open/closed sensor 54 detects a change from an open state to a closed state. An angle at which a closed state is detected is defined as $\theta 1$. When the tablet 10 is further closed from the state shown in FIG. 5A, the sensor element 22 approaches the keyboard dock 12 as shown in FIG. 5B, and the proximity sensor module 58 detects the proximity of the keyboard dock 12. An angle of the tablet 10 at which proximity is detected is defined as $\theta 2$ (less than $\theta 1$). That is, if the proximity sensor module 58 detects proximity after the open/closed sensor 54 detects a closed state, it can be determined that the tablet 10 has switched from the stand mode to the reverse tablet mode and the proximity sensor module 58 has detected the proximity of the keyboard dock 12. In this case, wireless communication output is not controlled.

FIG. 6 is a flowchart related to wireless output control cancellation by the EC 52 of the tablet 10. It is assumed that the tablet 10 is used in a condition where the open/closed angle is reduced from that in the stand mode shown in FIG. 4A and a switch is made to the reverse tablet mode shown in FIG. 4B. In block 102, an output LIDOC of the open/closed sensor 54 is checked, and it is determined whether a change from an open state to a closed state has been made. The open/closed sensor 54 measures the open/closed angle, and supplies the LIDOC signal indicating being closed to the EC 52 if the angle is less than or equal to el.

If a change from an open state to a closed state is detected, in block 104, an output SARIN of the proximity sensor module 58 is checked, and proximity or nonproximity is determined. The proximity sensor module 58 measures the capacitance between the sensor element 22 and an object to be detected (here, the keyboard dock 12), and supplies the SARIN signal indicating proximity to the EC 52 and the wireless communication module 56 if a value is greater than or equal to a threshold value. The wireless communication module 56 controls wireless output in block 106 upon receiving the SARIN signal indicating proximity.

As an index for evaluating a heating effect on a human body exposed to a radio wave, a specific absorption rate (SAR) is used. The SAR is an amount of energy absorbed in tissue per unit mass in a unit time, and is expressed in units of watts per kilogram (W/kg). In reality, because it is hard to directly measure the SAR, an electromagnetic field strength index expressed in a measurable physical quantity is set as the index. An index value is a value which is expressed in an electric field strength (V/m), a magnetic field strength (A/m) and a power density (mW/cm2) of incidence to the human body, and does not exceed a permissible value (W/kg) evaluated with the SAR. In block 106, wireless output is controlled so that the permissible value is not exceeded. More specifically, a gain of a transmission amplifier, a transmission antenna, etc., is reduced.

As shown in FIG. 5A and FIG. 5B, the open/closed angle $\theta 1$ of the tablet at which a closed state is detected is greater than the open/closed angle $\theta 2$ of the tablet 10 at which proximity is detected. Thus, a change from an open state to a closed state is necessarily detected and then proximity is detected when a switch is made from the stand mode to the reverse tablet mode. Therefore, when proximity is detected in block 104, the EC 52 recognizes that the tablet has switched from the stand mode to the reverse tablet mode. Therefore, because wireless output need not be controlled although proximity has been detected, the EC 52 supplies a reset signal SARRST to the proximity sensor module 58 in block 108. When the reset signal SARRST is supplied, the proximity sensor module 58 is reset, and the output signal SARIN indicates nonproximity. Thus, the wireless output control over the wireless communication module 56 exerted in block 106 is cancelled in block 108, and wireless output returns to a value before block 106.

In this manner, wireless output is controlled when the proximity sensor module 58 detects proximity. However, because the approach of the keyboard dock 12 is detected while the tablet 10 is switching from the stand mode to the reverse tablet mode, the human body may not be approaching and the control is cancelled. Wireless output is thereby prevented from being controlled because of the proximity of the keyboard dock 12.

In block 110, the output LIDOC of the open/closed sensor 54 is checked, and an open state or a closed state is determined. If the reverse tablet mode of FIG. 4B continues, a closed state is detected, and in block 114, the output SARIN of the proximity sensor module 58 is checked, and proximity or nonproximity is determined. If proximity is not detected, the flowchart returns to the check of the open/closed sensor 54 of block 110. In the reverse tablet mode of FIG. 4B, the proximity sensor module 58 is initialized by reset. Thus, if the human body approaches the sensor element 22, the proximity sensor module 58 detects proximity and supplies the SARIN signal indicating proximity to the EC 52 and the wireless communication module 56. In block 116, when the SARIN signal indicating proximity is received, the wireless communication module 56 controls wireless output, and the flowchart returns to the check of the open/closed sensor 54 of block 110. Thus, the proximity sensor module 58 reset after proximity is detected while a switch is made from the stand mode to the reverse tablet mode detects proximity, if the human body approaches in the reverse tablet mode of FIG. 4B. As a result, wireless output is controlled, and radio waves are prevented from affecting the human body.

If the tablet 10 is opened to switch from the reverse tablet mode of FIG. 4B to the stand mode, or the tablet 10 is detached from the keyboard dock 12 to switch to the tablet alone mode, the output LIDOC of the open/closed sensor 54 is made open in block 110, and it is determined whether operation is ended in block 112. If the operation is not ended, the flowchart returns to the check of the open/closed sensor 54 of block 102.

In this manner, the condition in which the tablet 10 is used can be identified in accordance with the output from the open/closed sensor 54 and the output from the proximity sensor module 58. In the reverse tablet mode, because the proximity sensor module 58, which has detected proximity, is reset, it is determined that the capacitance between the sensor element 22 in proximity to the keyboard dock 12 and the keyboard dock 12 is capacitance in a nonproximity state. The wireless output control which has been exerted because of proximity detection due to the approach of the keyboard dock 12 is thereby cancelled, and communication performance does not unnecessarily deteriorate. Therefore, in the reverse tablet mode, the wireless communication module 56 can communicate without decreasing transmission output when the human body is not in proximity.

FIG. 7 is a flowchart related to a modification of wireless output control by the EC 52 of the tablet 10. The flowchart of FIG. 7 differs from the flowchart of FIG. 6 in one point only. In FIG. 6, after a change from an open state to a closed state is detected in block 102, it is determined whether the proximity sensor module 58 detects proximity in block 104. In FIG. 6, if a person switches the tablet 10 from the stand mode to the reverse tablet mode while touching the vicinity of the antenna 20 and uses the tablet 10 while continuing to touch the vicinity of the antenna 20, the proximity sensor module 58 is kept reset, and wireless output may not be controlled although the human body is in proximity. To prevent this, in FIG. 7, after a change from an open state to a closed state is detected in block 102, it is determined whether a detection result of the proximity sensor module 58 transitions from nonproximity to proximity in block 104B. If the detection result of the proximity sensor module 58 transitions from nonproximity to proximity, output control, output control cancellation, etc., in and after block 106 are carried out. According to the process of FIG. 7, if the person switches the tablet 10 from the stand mode to the reverse tablet mode while touching the vicinity of the antenna 20, the proximity sensor module 58 is not reset (block 108 is not carried out). Therefore, a detection error, that is, non-detection in the state where the human body is approaching, can be prevented, and wireless output control is not cancelled.

FIG. 8 is a block diagram showing another example of the system configuration of the tablet 10 and the keyboard dock 12. A power supply switch 80 is interposed in a power supply line between the power supply 66 and the proximity sensor module 58. The EC 52 outputs a power supply control signal SARPON instead of the reset signal SARRST. The power supply control signal SARPON controls the power supply switch 80. The supply from the power supply 66 to the proximity sensor module 58 is turned on and off by the power supply switch 80. The other structures are the same as in FIG. 2. It should be noted that two wires of a reset signal line to the EC 52 and a power supply line from the power supply switch 80 are connected to the proximity sensor module 58. That is, a harness includes the two wires, and the number of wires can be reduced more than in the structure of FIG. 2. As shown in FIG. 1A, etc., the sensor element 22 is provided at the upper end of the tablet 10, and the proximity sensor module 58 is provided in proximity to the sensor element 22. On the other hand, the EC 52 and the power supply switch 80 are provided on the circuit board on the back surface of the LCD 38 of the tablet 10. It is therefore desirable that the number of wires be reduced, if the proximity sensor module 58 is connected to the power supply switch 80 with a wiring harness.

Figure 9:
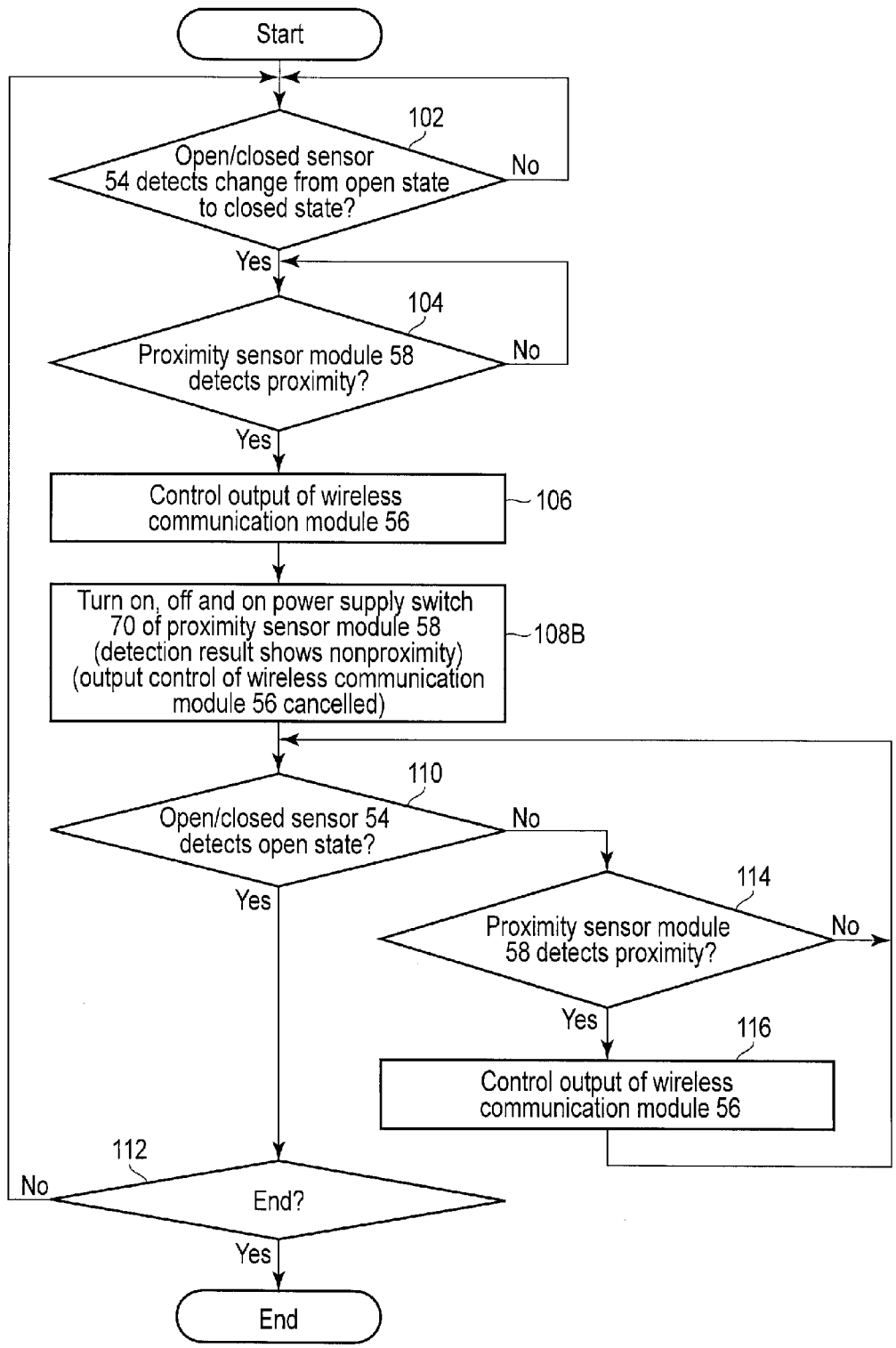
FIG. 9 is a flowchart showing an example of operation of the electronic apparatus of FIG. 8.

FIG. 9 is a flowchart related to wireless output control by the EC 52 of the tablet 10 of FIG. 8. The flowchart of FIG. 9 differs from the flowchart of FIG. 6 in one point only. In FIG. 6, after wireless output is controlled in block 106, in block 108, the EC 52 supplies the reset signal SARRST to the proximity sensor module 58 and resets the proximity sensor module 58, and a detection result shows nonproximity. In FIG. 9, after wireless output is controlled in block 106, in block 108B, the EC 52 supplies the power supply control signal SARPON to the power supply switch 70. When the power supply control signal SARPON is supplied, the power supply switch 70, which has been turned on, is once turned off, and then is turned on again. The power supply of the proximity sensor module 58 is thereby once stopped, and when it is restarted, the proximity sensor module 58 is in a reset state, a detection result shows nonproximity, and wireless output control is cancelled.

Figure 10:
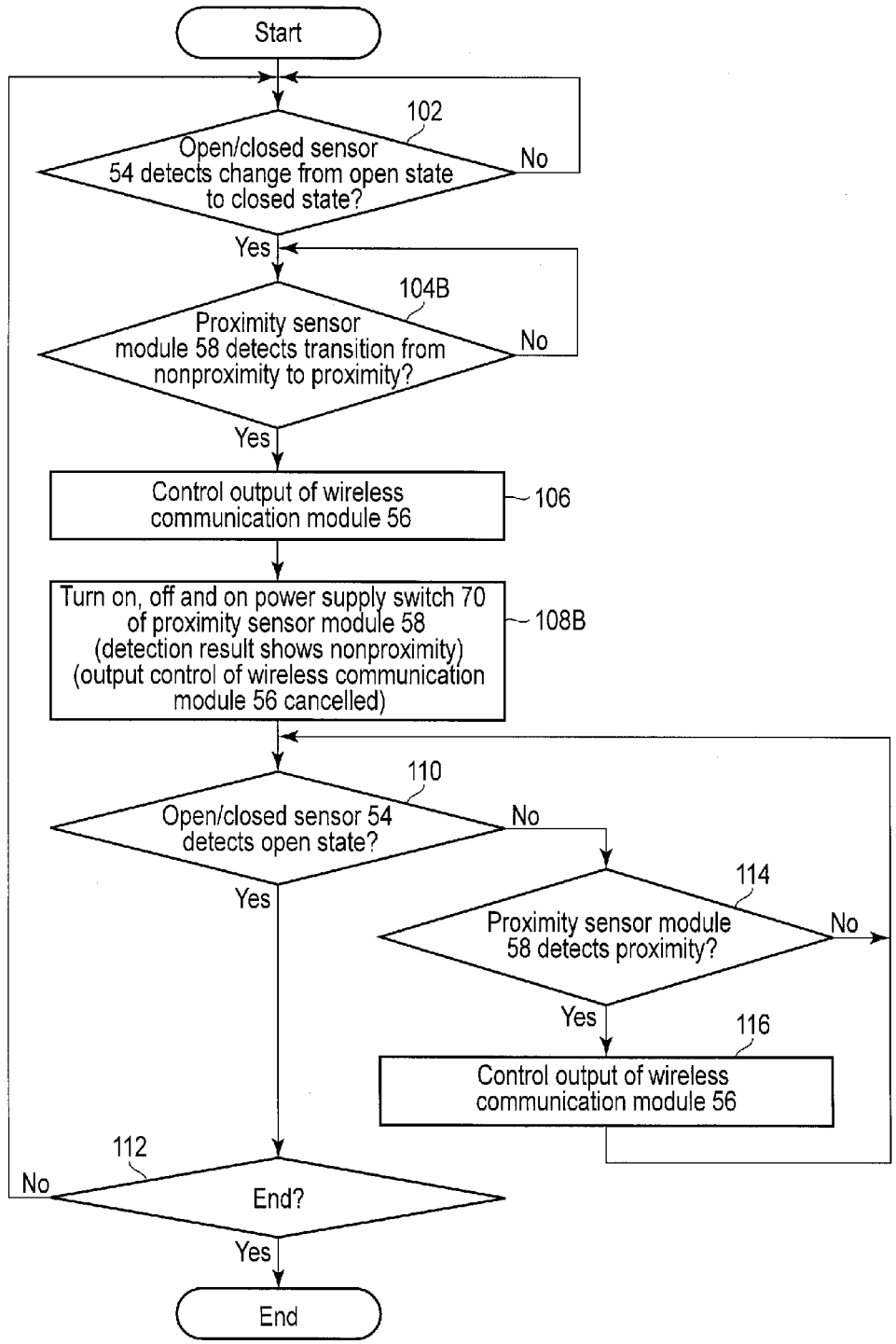
FIG. 10 is a flowchart showing another example of operation of the electronic apparatus of FIG. 8.

FIG. 10 shows a flowchart corresponding to the flowchart of FIG. 7 related to the structure of FIG. 2. That is, the flowchart of FIG. 10 differs from the flowchart of FIG. 9 in one point only. In FIG. 9, after a change from an open state to a closed state is detected in block 102, it is determined whether the proximity sensor module 58 detects proximity in block 104. In FIG. 10, after a closed state is detected in block 102, it is determined whether a detection result of the proximity sensor module 58 transitions from nonproximity to proximity in block 104B. If the detection result of the proximity sensor module 58 transitions from nonproximity to proximity, output control, output control cancellation, etc., in and after block 106 are carried out. According to the process of FIG. 10, if the person switches the tablet 10 from the stand mode to the reverse tablet mode while touching the vicinity of the antenna 20, the proximity sensor module 58 is not reset, and thus, wireless output control is not cancelled.

According to the structure of FIG. 8, the proximity sensor module 58 resets an initial value of capacitance by turning off and on the power supply 66. Thus, as in the structure of FIG. 2, in the reverse tablet mode, the proximity sensor module 58, which has detected proximity, is reset. Therefore, the wireless output control which has been exerted because of proximity detection due to the approach of the keyboard dock 12 is cancelled, and communication performance does not unnecessarily deteriorate. In the reverse tablet mode, the wireless communication module can communicate without decreasing transmission output when the human body is not in proximity.

Although the above description is related to an example in which the tablet 10 and the keyboard dock 12 are attachable and detachable, the tablet 10 and the keyboard dock 12 need not necessarily be attachable and detachable. The description can be applied to cases where in a so-called convertible notebook PC with a hinge rotatable at 360 degrees, a display panel in an open state as shown in FIG. 1A is further inclined backward to bring a back surface of a display into contact with a back surface of a keyboard and expose a screen of the display panel. In such a notebook PC, the display panel corresponds to a first unit, and a main body (keyboard) corresponds to a second unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first unit configured to be open and closed with respect to a second unit, the first unit comprising a first sensor, a second sensor, and a wireless communication device, wherein the first sensor is configured to detect approach of an object, and the second sensor is configured to detect whether the first unit is open or closed; and
circuitry configured to reduce transmission power of the wireless communication device when the first sensor detects approach of the object, and not to reduce transmission power of the wireless communication device when the second sensor detects a change from an open state to a closed state and the first sensor detects approach of the object.

2. The electronic apparatus of claim 1, wherein:
the circuitry is configured to reset the first sensor when the first sensor detects approach of the object while the second sensor detects a change from an open state to a closed state; and
a detection result of the first sensor indicates nonproximity when the first sensor is reset.

3. The electronic apparatus of claim 1, wherein:
the circuitry is configured to reset the first sensor when the first sensor detects that the object has changed from not being approaching to being approaching while the second sensor detects a change from an open state to a closed state; and
a detection result of the first sensor indicates nonproximity sensor is reset.

4. The electronic apparatus of claim 1, wherein:
the circuitry is configured to turn off and then turn on a power supply of the first sensor when the first sensor detects approach of the object while the second sensor detects a change from an open state to a closed state; and
a detection result of the first sensor indicates nonproximity when the power supply of first sensor is turned on.

5. The electronic apparatus of claim 1, wherein:
the circuitry is configured to turn off and then turn on a power supply of the first sensor when the first sensor detects that the object has changed from not being approaching to being approaching while the second sensor detects a change from an open state to a closed state; and
a detection result of the first sensor indicates nonproximity when the power supply of the first sensor is turned on.

6. The electronic apparatus of claim 1, wherein:
the second unit comprises a keyboard;
the first unit comprises a display mounted on the keyboard, the display being configured to be open and closed; and
the first sensor comprises a capacitive proximity sensor configured to detect approach of a human body or the keyboard.

7. The electronic apparatus of claim 6, wherein:
the keyboard comprises a keyboard dock;
the display comprises a tablet mounted on the keyboard dock to be attachable and detachable, the tablet being configured to be open and closed with respect to the keyboard dock.

8. A method electronic apparatus,
the electronic apparatus comprising:
a first unit configured to be open and closed with respect to a second unit, the first unit comprising a first sensor, a second sensor, and a wireless communication device, wherein the first sensor is configured to detect approach of an object, and the second sensor is configured to detect whether the first unit is open or closed,
the method comprising:
reducing transmission power of the wireless communication device when the first sensor detects approach of the object; and
not reducing transmission power of the wireless communication device when the second sensor detects a change from an open state to a closed state and the first sensor detects approach of the object.

9. The method of claim 8, further comprising:
resetting the first sensor when the first sensor detects approach of the object while the second sensor detects a change from an open state to a closed state,
wherein a detection result of the first sensor indicates nonproximity when the first sensor is reset.

10. The method of claim 8, further comprising:
resetting the first sensor when the first sensor detects that the object has changed from not being approaching to being approaching while the second sensor detects a change from an open state to a closed state,
wherein a detection result of the first sensor indicates nonproximity when the first sensor is reset.

11. The method of claim 8, further comprising:
turning off and then turn on a power supply of the first sensor when the first sensor detects approach of the object while the second sensor detects a change from an open state to a closed state,
wherein a detection result of the first sensor indicates nonproximity when the power supply of the first sensor is turned on.

12. The method of claim 8, further comprising:
turning off and then turn on a power supply of the first sensor when the first sensor detects that the object has changed from not being approaching to being approaching while the second sensor detects a change from an open state to a closed state, wherein a detection result of the first sensor indicates nonproximity when the power supply of the first sensor is turned on.

13. The method of claim 8, wherein:

the second unit comprises a keyboard, the first unit comprises a display mounted on the keyboard, the display being configured to be open and closed, and the first sensor comprises a capacitive proximity sensor configured to detect approach of a human body or the keyboard.

14. The method of claim 13, wherein:

the keyboard comprises a keyboard dock, the display comprises a tablet mounted on the keyboard dock to be attachable and detachable, the tablet being configured to be open and closed with respect to the keyboard dock.

\* \* \* \* \*